United States Patent [19]

Bauer

[11] Patent Number: 4,499,409
[45] Date of Patent: Feb. 12, 1985

[54] PLUGGING DEFEAT SYSTEM FOR ELECTRIC MOTORS

[75] Inventor: James J. Bauer, Richland, Mich.

[73] Assignee: Clark Equipment Company, Buchanan, Mich.

[21] Appl. No.: 575,529

[22] Filed: Jan. 31, 1984

[51] Int. Cl.³ ........................ H01H 35/06; H02P 3/10
[52] U.S. Cl. .................................... 318/383; 318/284; 318/373; 310/103; 200/61.39; 335/29
[58] Field of Search ............... 318/283, 284, 285, 374, 318/373, 383; 310/103; 200/61.39; 335/29, 61, 62, 65, 74, 75

[56] References Cited

U.S. PATENT DOCUMENTS

| | | | |
|---|---|---|---|
| 1,791,458 | 2/1931 | Whittingham | 318/374 X |
| 2,209,368 | 7/1940 | Whittaker | 335/75 |
| 2,467,785 | 4/1946 | Strong | 318/284 X |
| 2,494,611 | 1/1950 | Eisenberg | 318/284 X |
| 2,661,451 | 12/1953 | Tamm | 335/62 X |
| 2,718,567 | 9/1955 | Elliott | 335/75 |
| 3,164,698 | 1/1965 | Perrine | 335/74 X |
| 3,450,850 | 6/1969 | Raschke | 200/61.39 |
| 3,527,905 | 9/1970 | Doi | 200/61.39 X |
| 3,551,769 | 12/1970 | Tedd | 318/383 X |
| 4,406,934 | 9/1983 | Elszasz | 200/61.39 |

OTHER PUBLICATIONS

Brochure "Magnetic Drives", from Indiana General Co., Engineering Data Form 382, Mar. 1970.

Primary Examiner—William M. Shoop
Assistant Examiner—Bentsu Ro
Attorney, Agent, or Firm—Marmaduke A. Hobbs

[57] ABSTRACT

A plugging defeat system for use with a reversible electric motor having a motor shaft. A slipping clutch-type mechanism is used to sense the speed and direction of the motor and to selectively open forward or reverse enabling switches when the motor reaches a predetermined speed. If operating in the forward direction, the clutch mechanism will open the reverse enabling switch, once the predetermined speed is reached, preventing motor reversal until the speed has fallen to a safe level, and vice versa.

14 Claims, 4 Drawing Figures

PLUGGING DEFEAT SYSTEM FOR ELECTRIC MOTORS

BACKGROUND OF THE INVENTION

1. Field of the Invention

This invention relates to the field of electric motors and, more particularly, to a motor control system for protecting an electric drive motor against excessive torque when reversing the direction of rotation.

2. Description of the Prior Art

Electric motors generally perform as either generators or alternators when they are driven. A universal type (series wound) electric motor, commonly employed as the drive motor or traction motor in, for example, electric forklift trucks, acts as a generator even when it is operated as a motor. The generated voltage is referred to as back EMF (electromotive force), and serves to oppose supply voltage, thereby decreasing the net voltage available to power the motor. When a series wound electric motor is running in one direction and is then switched into reverse, back EMF and supply voltage become additive, causing the motor to develop a sudden, strong reverse torque, a procedure commonly referred to as "plugging". Plugging is used in some instances by operators as a means of braking the vehicle or motor; however, the sudden torque can damage the motor or other associated elements. For example, with electric forklift trucks, plugging, or the application of a high reverse torque, can damage the gear train of the truck, can throw loads from the load-carrying forks, or can even upset the vehicle under the right conditions. Thus, reversing torque must be either appropriately limited and controlled, or it must be eliminated altogether. Total elimination can easily be accomplished by shutting down the rotation of the motor in one direction and waiting for the motor to stop before reversing the rotation. However, this practice is wasteful in terms of time and energy consumption, and the plugging feature may be desirable in some instances as, for example, an auxiliary braking method, especially in emergency situations or other instances where reversal of the motor must be effected quickly.

SUMMARY OF THE INVENTION

It is, therefore, one of the principal objects of the present invention to provide protection for electric drive motors against excessive reverse torque through a plugging defeat system which, when a motor is being driven in one direction and is shifted into reverse, delays the application of reverse power until the motor has slowed to a safe rotational rate.

Another object of the present invention is to provide a plugging defeat system which senses the rotational direction and speed of the motor and actuates normally closed inhibit switches, which prevent application of power in the opposite direction, once the motor reaches a predetermined speed, and which may use alternative sensing means, such as a viscous drive unit or an eddy current generator-type unit.

A further object of the present invention is to provide a plugging defeat system which can advantageously be utilized with a plurality of electric drive motors, in vehicles and in other applications, and which requires minimal re-wiring, permitting economical retrofitting of existing control systems.

A still further object of the present invention is to provide a plugging defeat system which is automatic and simple in construction and operation and which is not subject to operator override, for further motor protection.

These and other objects are attained by the present invention, which relates to a plugging defeat system for use with a reversible electric motor having a shaft. A means is provided for sensing the speed and direction of the motor, and above a predetermined speed in either direction, the sensing means activates switch means for preventing current flow in the direction opposite that in which the motor is moving. The switch means are selectively activated by a lever means, operatively connected to the sensing means. The system thus permits plugging at low motor speeds for conserving time and energy, and preserving the desirable braking feature associated with plugging for use in emergency situations. Above the predetermined speed, where plugging could cause damage to the motor, the vehicle or machine, or the operator, plugging is prevented by the operation of the sensing means. When the motor speed falls below the predetermined level, the sensing means deactivates the switch means, and operation in the reverse direction may then proceed.

Various other objects and advantages of the present invention will become apparent from the description below with reference to the accompanying drawings.

DETAILED DESCRIPTION OF THE PREFERRED EMBODIMENT

Figure 1:
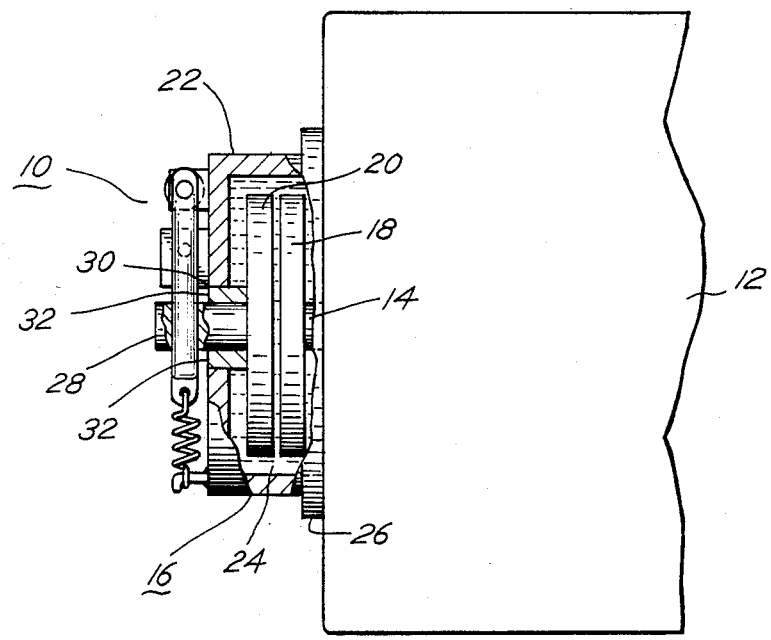
FIG. 1 is a side elevational view, shown partially in cross-section, of the plugging defeat system embodying the present invention, shown here connected to an electric motor.

Referring more specifically to the drawings, and to FIG. 1 in particular, numeral 10 designates generally the plugging defeat system embodying the present invention, shown here connected to an electric drive motor 12. The motor, in turn, is connected to a suitable power source (not shown). The present invention is easily integrated into the existing control systems of electric motors in vehicles or in other applications where reversing of the motor is a necessary function, such as in certain machine tools, conveyor drives, or similar devices. The plugging defeat system 10 has been designed to delay the application of reverse power until the motor has slowed to a safe rotational rate, or stopped altogether.

In the embodiment shown in FIG. 1, the drive motor 12 has an axially extending shaft 14, which is adapted to drive a motor speed and direction sensing means such as the slippingclutch type device or viscous drive unit designated generally by numeral 16. Shaft 14 is secured to and drives a viscous driver disc 18, which, in turn, drives a viscously driven disc 20 under operating conditions as explained below. Both discs 18 and 20 are coaxial and in relatively close proximity within housing 22, which contains a fluid 24. Housing 22 has a peripheral flange 26 by which the housing is secured to the motor in any suitable manner, as by welding or by the use of bolts (not shown). The viscously driven disc 20 has an axially extending shaft 28 which is co-axial with shaft 14 and extends outwardly from housing 22 through a central opening 30. The housing is sealed by an elastomeric sealing means, such as ring 32, which surrounds shaft 28 in opening 30.

Mounted on the external face of housing 22 are two normally closed electrical enabling switches 40 and 42, which enable the forward and reverse contactors, respectively, as explained below. Disposed between the two switches is a lever arm 44 which is secured to shaft 28. A resilient means, such as tension spring 46, has its upper end secured to the lower end of arm 44 and its lower end secured to a retaining means such as hook 48 mounted on housing 22. The spring is designed, under conditions of slow rotation or during periods of non-operation, to center arm 44 between switches 40 and 42, thus keeping both switches in their normally closed positions. Adjustable stop means, such as set screws 50 and 51, are mounted on housing 22 near the upper end thereof, on the right and left sides, to limit the angular displacement of arm 44 under operating conditions once sufficient contact has been made with either switch, to protect the switches from damage.

When the motor is at rest, or under conditions of slow rotation in either direction, the viscous drive unit 16 generates insufficient torque to overcome the centering effect of spring 46 and, with arm 44 centered, switches 40 and 42 remain closed. As rotation increases above a desired, predetermined rotational rate, driver disc 18 acts on driven disc 20 through hydrodynamic pressure, and the unit 16 generates sufficient torque to drive disc 20 and overcome the centering effect of the spring. Thus, depending on the direction of rotation, arm 44 will then be biased to either the right or the left side, as viewed in FIG. 2, and will contact and open either switch 40 or switch 42. As the motor rate is reduced, and less torque is produced by drive unit 16, the spring overcomes the effect of the generated torque and again centers arm 44, closing the previously open switch.

Figure 2:
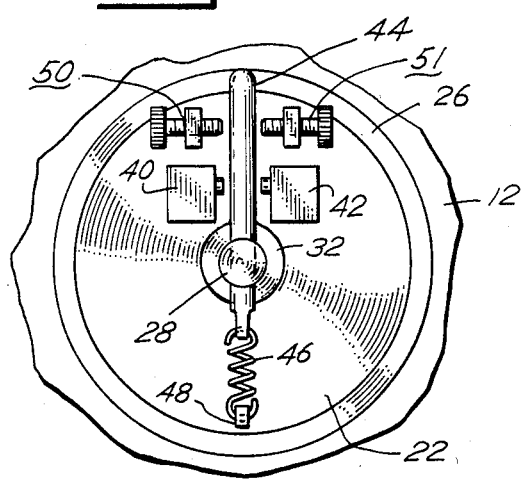
FIG. 2 is a front elevational view of the plugging defeat system shown in the preceding figure.
Figure 3:
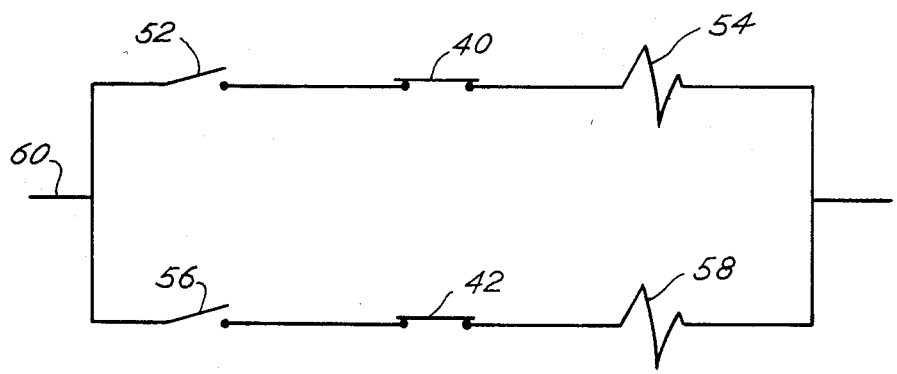
FIG. 3 is a schematic circuit diagram of the plugging defeat system embodying the present invention.

Referring to FIG. 3, the present invention is shown in schematic form. The system includes a forward switch 52 and a forward contactor coil 54, connected in series with forward enabling switch 40. Also included are a reverse switch 56 and a reverse contactor coil 58, connected in series with reverse enabling switch 42. Forward and reverse switches 52 and 56, respectively, are connected through line 60 to the forward and reverse controls (not shown) mounted on the vehicle, or at the operator's station of the particular motor. If the operator selects the forward mode, for example, the control lever (not shown) is moved to forward, thereby closing forward switch 52. Power can then flow through switch 52 and normally closed forward enabling switch 40 to the forward contactor coil 54. As the motor accelerates through a certain selected speed range, driver disc 18 acts on driven disc 20 in the slipping clutch unit 16, thereby actuating arm 44 to the right, as shown in FIG. 2. This opens enabling switch 42, which will remain open until the motor slows enough for spring 46 to pull arm 44 back to its center position. With switch 42 open, the motor can not be operated in reverse, since no current can reach reverse contactor coil 58.

If the operation proceeds in the forward mode as described above with switch 42 open, and the operator then selects the reverse mode by opening forward switch 52 and closing reverse switch 56, normally plugging would ensue, possibly damaging the motor. However, since enabling switch 42 is open, no current can flow to reverse direction until the motor slows enough for arm 44 to be re-centered by spring 46. Once this occurs, switch 42 closes, current can flow to reverse contactor coil 58, and operation in the reverse direction may proceed. As the motor accelerates in reverse past a certain selected speed, the slipping clutch will act to bias arm 44 to the left, as seen in FIG. 2. This opens forward enabling switch 40, thereby preventing plugging in the forward mode until the reverse switch 56 is opened, disconnecting coil 58, and allowing the motor to slow down. As the motor slows enough for the spring 46 to re-center arm 44 and close enabling switch 40, current may then flow in the forward direction.

The present system is particularly advantageous in that plugging is permitted at low, relatively safe, forward or reverse speeds, thus conserving time and energy. The plugging capability is prevented past a certain higher speed, thereby protecting the motor, its components, and the operator. The activation of the plugging defeat system occurs during acceleration past a certain minimum value, providing protection if reversal is attempted during high speed operation, but does not occur at low speeds, allowing, for example, jogging of a load or the motor without unnecessary delays while waiting for the motor to stop rotating.

Figure 4:
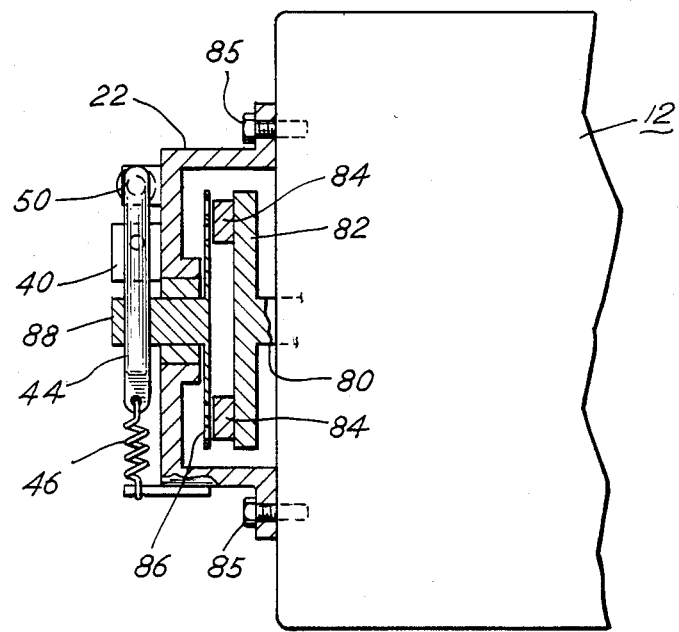
FIG. 4 is a side elevational view, shown partially in cross-section, of an alternative embodiment of the plugging defeat system, shown here connected to an electric motor.

An alternative embodiment of the slipping clutch-type device is shown in FIG. 4, where like parts have been assigned like numbers. In this embodiment, motor 12 has an outwardly and axially extending shaft 80. Fixed to shaft 80 is a flange 82, upon which are mounted a plurality of regularly spaced permanent magnets 84. A perforated disc 86 of a suitable material, such as aluminum, is mounted within housing 22, in close proximity to the magnets. Housing 22 is secured to the motor with any suitable means, such as bolts 85. As rotation of the motor and magnets occurs, torque is produced on disc 86 by means of induced eddy currents in the aluminum. Disc 86 has an axially extending shaft 88 which is secured to lever arm 44, as in the previously disclosed embodiment. As the motor accelerates past a certain selected speed, enough torque is produced to move disc 86 and shaft 88 to bias arm 44 to the left or right, depending on the direction of rotation, thereby opening either the forward enabling switch 40 or the reverse enabling switch 42 and preventing plugging of the motor as hereinbefore described.

From the foregoing, it is believed that those familiar with the art will readily recognize and appreciate the novel concepts and features of the present invention. Numerous variations, changes, and substitutions of equivalents will present themselves to persons skilled in the art, and may be made without departing from the scope of this invention. As a result, the embodiments disclosed herein are subject to various modifications, changes, and the like, with the scope of this invention being determined by reference to the claims appended hereto.

What is claimed is:

1. A plugging defeat system for use with a reversible electric motor having a shaft and a power source, comprising a motor speed and direction sensing means operatively connected to the motor shaft, a shaft member operatively connected to said sensing means for rotation therewith when the motor reaches a predetermined speed in either direction, a forward enabling switch connected in series with the control means and the motor for enabling the motor in a forward direction, a reverse enabling switch connected in series with the control means and the motor for enabling the motor in a reverse direction, and a lever means operatively connected to said shaft member for selectively opening said reverse enabling switch when the motor reaches a predetermined speed in the forward direction, and for selectively opening said forward enabling switch when the motor reaches a predetermined speed in the reverse direction.

2. The plugging defeat system as claimed in claim 1 in which said sensing means includes a slipping clutch having a drive unit with a driver disc member connected to the motor shaft, a driven disc member connected to said shaft member, and a housing for enclosing said driver and driven disc members.

3. The plugging defeat system as claimed in claim 2 in which said lever means has upper and lower ends and is connected to said shaft member approximately midway between said ends, and a resilient means having upper and lower ends, said upper end of said resilient means being secured to said lower end of said lever means, and said lower end of said resilient means being connected to said housing for biasing said lever means away from said enabling switches.

4. The plugging defeat system as claimed in claim 3 in which said first switch is a normally closed forward enabling switch and said second switch is a normally closed reverse enabling switch, mounted on said housing, one on each side of said lever means, and stop means are mounted on said housing near each of said switches for receiving said upper end of said lever means and limiting the movement of said lever means relative to said switches upon activation of said lever means by said drive unit.

5. The plugging defeat system as claimed in claim 1 in which said sensing means includes a slipping clutch having an eddy current generator unit with a flanged member secured to the motor shaft and a plurality of permanent magnets secured to said flanged member for rotation therewith, and a perforated aluminum disc secured to said shaft member in closely spaced relation to said magnets for receiving the magnetic field created by said rotating magnets for moving said lever means.

6. The plugging defeat system as claimed in claim 5 in which said lever means has upper and lower ends and is connected to said shaft member approximately midway between said ends, and a resilient means having upper and lower ends has said upper end secured to said lower end of said lever means, and said lower end of said resilient means is connected to said housing for biasing said lever means away from said switches.

7. The plugging defeat system as claimed in claim 6 in which said switches are mounted on said housing, one on each side of said lever means, and stop means are mounted on said housing near each of said switches for receiving said upper end of said lever means and limiting the movement of said lever means relative to said switch means upon activation of said lever means by said eddy current generator unit.

8. A plugging defeat system for use with a reversible electric motor having a shaft and a power source, comprising a slipping clutch means for sensing the speed and direction of the motor, including a viscous drive unit having a housing, a driver disc connected to said motor shaft, a driven disc closely spaced from and co-axial with said driver disc, and a viscous fluid in said housing for acting on said driven disc under the force applied by said driver disc, when the motor reaches a predetermined speed in either direction, a shaft member operatively connected to said driven disc for rotation therewith when the motor reaches a predetermined speed in either direction, switch means for enabling the motor in forward and reverse directions, and a lever means operatively connected to said shaft member for selectively opening said switch means, said switch means including a normally closed forward enabling switch and a normally closed reverse enabling switch mounted on said housing on opposite sides of said lever means for transmitting electrical current from the power source to the motor when in a closed position and for preventing the respective current flow when either of said switches is opened by said lever means.

9. The plugging defeat system as claimed in claim 8 in which said lever means has upper and lower ends and is connected to said shaft member approximately midway between said ends, and a resilient means is secured to said lower end for biasing said lever means away from said switch means.

10. The plugging defeat system as claimed in claim 9 in which said resilient means includes a tension spring connected to said lever means, and stop means mounted near each of said switches for limiting the displacmeent of said lever means after contact has been made with either of said switches.

11. The plugging defeat system as claimed in claim 9 in which said resilient means includes a tension spring having upper and lower ends with said upper end connected to said lever means, and said housing has a hook member for receiving said lower end of said spring, and stop means mounted near each of said switches for limiting the displacement of said lever means after contact has been made with either of said switches.

12. A plugging defeat system for use with a reversible electric drive motor having a shaft, a power source, and control means for operating the motor, said system comprising a slipping clutch means operatively connected to the motor shaft for rotation therewith for sensing the speed and direction of the motor, a shaft member operatively connected to said clutch means for rotation therewith when the motor reaches a predetermined speed in either direction, a forward enabling switch connected in series with the control means and the motor for enabling the motor in a forward direction, a reverse enabling switch connected in series with the control means and the motor for enabling the motor in a reverse direction, and a lever means operatively connected to said shaft member for selectively opening said reverse switch when the motor reaches a predetermined speed in the forward direction, and for selectively opening said forward switch when the motor reaches a predetermined speed in the reverse direction.

13. The plugging defeat system as claimed in claim 12 in which said slipping clutch means includes a viscous drive unit having a housing, a driver disc secured to the motor shaft for rotation therewith, a driven disc closely spaced from and co-axial with said driver disc and secured to said shaft member, and a viscous fluid in said housing for acting on said driven disc under the force applied by said driver disc when the motor reaches a predetermined speed in either direction.

14. The plugging defeat system as claimed in claim 12 in which said slipping clutch means includes an eddy current generator unit having a housing, a flanged member in said housing secured to the motor shaft for rotation therewith, a plurality of permanent magnets mounted in spaced relation on said flanged member, and a disc member in said housing secured to said shaft member in closely spaced relation to said magnets for receiving the magnetic field produced by said magnets upon rotation thereof.

* * * * *